US008704097B2

(12) United States Patent
Xu et al.

(10) Patent No.: US 8,704,097 B2
(45) Date of Patent: Apr. 22, 2014

(54) HIGH VOLTAGE BUSHING ASSEMBLY

(75) Inventors: James Jun Xu, Niskayuna, NY (US); Rolando Luis Martinez, Clifton Park, NY (US); Venkata Subramanya Sarma Devarakonda, Karnataka (IN); Lin Zhang, Shanghai (CN)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 13/355,911

(22) Filed: Jan. 23, 2012

(65) Prior Publication Data

US 2013/0186683 A1 Jul. 25, 2013

(51) Int. Cl.
*H01B 17/26* (2006.01)
*H02G 3/18* (2006.01)

(52) U.S. Cl.
USPC ... 174/142; 174/144; 174/152 R; 174/11 BH; 174/650; 16/2.1

(58) Field of Classification Search
USPC ..... 174/140 R, 142, 144, 650, 152 R, 11 BH, 174/14 BH, 31 R, 137 R, 141 C, 140 C, 174/140 CR; 16/2.1, 2.2
See application file for complete search history.

(56) References Cited

U.S. PATENT DOCUMENTS 3,055,968 A * 9/1962 Spiece ........................ 174/31 R
3,791,859 A * 2/1974 Hirayama ................. 174/140 R
3,819,851 A * 6/1974 Nigol ........................ 174/141 C
3,888,796 A 6/1975 Nigol
3,982,048 A * 9/1976 Zlupko ..................... 174/140 C
4,232,185 A 11/1980 Higuchi et al.
4,237,415 A * 12/1980 Easley ..................... 174/11 BH
4,447,492 A 5/1984 McKaveney
4,465,900 A * 8/1984 Mitsumatsu et al. ..... 174/140 C
4,524,404 A 6/1985 Verma
4,540,848 A 9/1985 Beijar et al.
4,584,429 A * 4/1986 Raketti et al. ................ 174/142
4,760,216 A 7/1988 Thiel et al.
5,200,578 A 4/1993 Brucker
5,483,023 A 1/1996 Barnes
6,162,752 A 12/2000 Kawamoto et al.
6,340,497 B2 1/2002 Wilson et al.
6,346,677 B1 2/2002 Guillemette et al.
6,475,941 B1 11/2002 Liebermann
6,515,232 B2 * 2/2003 Forster ...................... 174/152 R
6,864,432 B2 3/2005 Boettcher et al.
6,951,987 B1 10/2005 Hansen et al.
7,262,143 B2 8/2007 Imai et al.
7,262,367 B2 8/2007 Donzel et al.
7,742,676 B2 6/2010 Tilliette et al.
8,222,526 B2 * 7/2012 Bresney et al. .......... 174/11 BH
8,492,656 B2 * 7/2013 Martinez et al. ......... 174/11 BH

* cited by examiner

*Primary Examiner* — Angel R Estrada
(74) *Attorney, Agent, or Firm* — Cantor Colburn LLP

(57) ABSTRACT

A high voltage bushing assembly includes an insulating sleeve which is made of high strength alumina porcelain to surround a conductor, a flange located on an outside surface of the insulating sleeve, and a band of semiconductive glaze located on the outer surface of the insulating sleeve spaced apart from an end of the insulating sleeve.

20 Claims, 5 Drawing Sheets

HIGH VOLTAGE BUSHING ASSEMBLY

BACKGROUND OF THE INVENTION

The subject matter disclosed herein relates to high voltage bushing assemblies.

When power is provided to a device or structure, a bushing assembly may be used to help isolate the power line from the building or structure. For example, bushings are used to provide high voltages to turbines. Bushings include a conductor, an insulating sleeve around the conductor, and a device to affix the insulating sleeve to the building or structure. The conductor passes through the insulating sleeve and into the building or structure.

BRIEF DESCRIPTION OF THE INVENTION

According to one aspect of the invention, a bushing assembly comprises an insulating sleeve to surround a conductor; a flange located on an outside surface of the insulating sleeve; and a first band of semiconductive glaze located on the outer surface of the insulating sleeve spaced apart from a first end of the insulating sleeve.

According to another aspect of the invention, a high-voltage bushing system comprises a bushing having an insulating sleeve to surround a conductor and a flange on an outside surface of the insulating sleeve to mount the bushing to a structure, the outside surface of the insulating sleeve having at least one band of semiconductive glaze located spaced apart from an end of the insulating sleeve; and a current transformer spaced apart from the bushing to monitor a current of the conductor.

According to yet another aspect of the invention, a high-voltage bushing assembly comprises an insulating sleeve to surround a conductor; at least one band of semiconductive glaze on a surface of the insulating sleeve; and non-semiconductive glaze on portions of the surface of the insulating sleeve that do not include the at least one band of semiconductive glaze.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
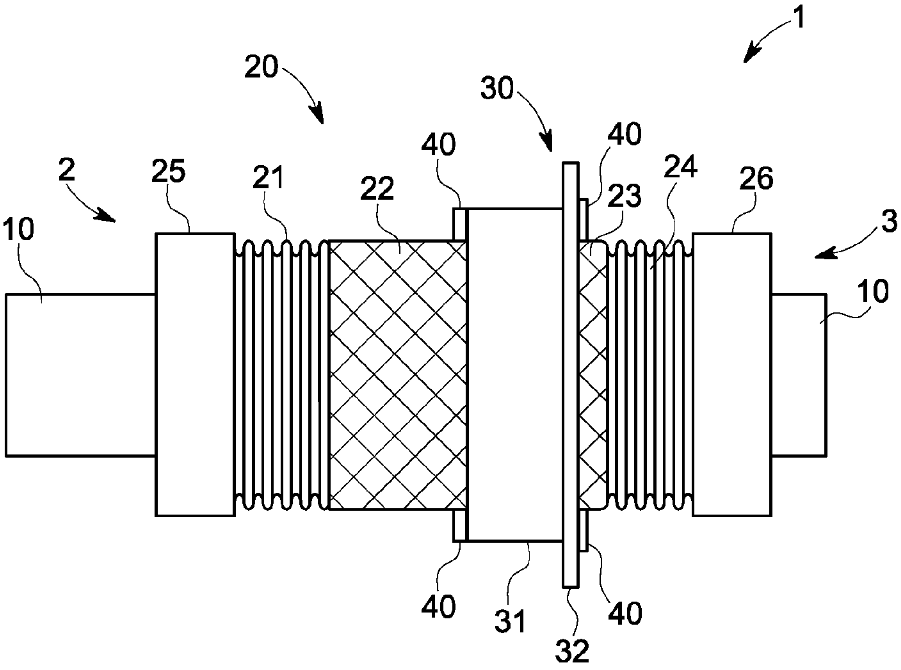
FIG. 1 illustrates a bushing according to an embodiment of the invention.

FIG. 1 illustrates a bushing 1 according to an embodiment of the present invention. The bushing 1 includes an insulating sleeve 20 surrounding a conductor 10. In one embodiment, the insulating sleeve 20 is made of porcelain. For example, the insulating sleeve 20 may be made of high strength C-120/C-130 alumina porcelain. A flange 30, which is made of non-magnetic materials such as, for example, stainless steel, surrounds the insulating sleeve 20. In one embodiment, the flange 30 is mounted to a fixed surface, so that one end of the bushing 1 is located on one side of the surface and the other end of the bushing 1 is located on the other side of the fixed surface. The fixed surface may be, for example, the shell of a turbine, more specifically, of generator stator frame assembly.

At a first end 2 of the bushing 1, between an exposed portion of the conductor 10 and the flange 30, are a first set of annular ribs or ridges 21 and a first semiconductive-glazed band 22. A non-semiconductive-glazed portion 25 is located between the exposed portion of the conductor 10 and the ridges 21. At a second end 3 of the bushing 1 on the other side of the flange 30, are a second set of annular ribs or ridges 24 and a second semiconductive-glazed band 23. A non-semiconductive-glazed portion 26 is located between the second set of ridges 24 and an exposed portion of the conductor 10. Throughout the specification and claims, the first and second sets of annular ribs or ridges 21 and 24 are referred to as ribs, ridges, ribbed/ridged portions, sets of ribs/ridges, annular ribs/ridges, and the like.

The flange 30 includes a base portion 31 having a substantially cylindrical or conic shape, and an extended portion 32 extending from the base portion 31. In one embodiment, the extended portion has a substantially disk-like shape. In some embodiments, the flange 30 includes additional features, such as supporting braces and holes for mounting or fixing the flange 30 to a surface. In another embodiment, the base portion 31 of the flange 30 is parallel to the surface of the insulating sleeve 20. For example, each of the outer surfaces of the insulating sleeve 20 and the base portion 31 of the flange 30 may be cylindrically or conically shaped, and the base portion 31 of the flange 30 may extend along a portion of the outer surface of the insulating sleeve 20 and surround the insulating sleeve 20.

The semiconductive-glazed bands 22 and 23 are portions of the bushing 1 in which semiconductive materials are incorporated into a glaze that makes up an outer layer of the insulating sleeve 20. In some embodiments, the portions of the bushing 1 that do not include the semiconductive-glazed bands 22 and 23, such as the ridged portions 21 and 24 and the portions 25 and 26, are glazed with a non-semiconductive glaze. Applying a semiconductive glaze to the insulating sleeve 20 bonds the semiconductor material to the insulating sleeve 20 stronger than if applied as a layer by other means, such as by chemically depositing or coating a semiconductive material on a previously-glazed insulating sleeve 20 or a non-glazed insulating sleeve 20.

The semiconductive-glazed bands 22 and 23 are located on either side of the flange 30. In one embodiment, the semiconductive-glazed bands 22 and 23 are located immediately adjacent to the flange 30. In other words, in one embodiment, no non-semiconductive-glazed portion is located between the flange 30 and the semiconductive-glazed bands 22 and 23. By locating the semiconductive-glazed bands 22 and 23 adjacent to the flange 30, the corona and flashover resistance of the bushing 1 is substantially increased.

In the embodiment illustrated in FIG. 1, the semiconductive-glazed bands 22 and 23 are located between ridged portions 21 and 24 and the flange 30, respectively. However, in alternative embodiments, portions of the ridges 21 and 24 are also glazed with the semiconductor glaze. In yet other embodiments, portions of the outer surface of the insulating sleeve beneath the flange are glazed with the semiconductor glaze.

The semiconductive-glazed bands 22 and 23 are bands that circumscribe the insulating sleeve 20. The glazed portions of the insulating sleeve 20 that surround the bands 22 and 23 include a normal glaze that does not include semiconductive materials. The normal glaze has a relatively high surface resistivity, such a surface resistivity in the range from $10^{12}$-$10^{14}$ ohms/square ("ohms/sq"). According to one embodiment, the surface resistivity of the semiconductive-glazed bands 22 and 23 is in a range from $10^{8}$-$10^{9}$ ohms/sq. In one embodiment, the semiconductive-glazed bands 22 and 23 are homogeneous, or comprising each only one band having one resistivity rather than multiple bands having different resistivities.

According to one embodiment, the semiconductive glaze increases the porcelain surface temperature to several degrees Celsius higher because of the nature of resistivity-based voltage grading, which prevents moisture condensation and ambient pollution deposits, which further improves corona resistance of the bushing 1.

In some embodiments, the semiconductor glaze is made with voltage-grading materials having a surface resistivity that decreases with increased electric fields or temperatures. An example of the voltage-grading materials includes iron-titanium oxide. Other examples include tin oxide, silicon carbide, silicon nitride, aluminum nitride, boron nitride, boron oxide, molybdenum oxide, molybdenum disulfide, $Ba_2O_3$, and aluminum carbide. In one embodiment, the linear thermal expansion of the semiconducting glaze is smaller than that of the base material, such as porcelain, of the insulating sleeve 20.

In one embodiment of the present invention, electrically conductive adhesive 40 is applied at both ends of the flange 30 adjacent to the semiconductive-glazed bands 22 and 23. The electrically conductive adhesive 40 electrically connects the flange 30 to the semiconductive-glazed bands 22 and 23.

Figure 2:
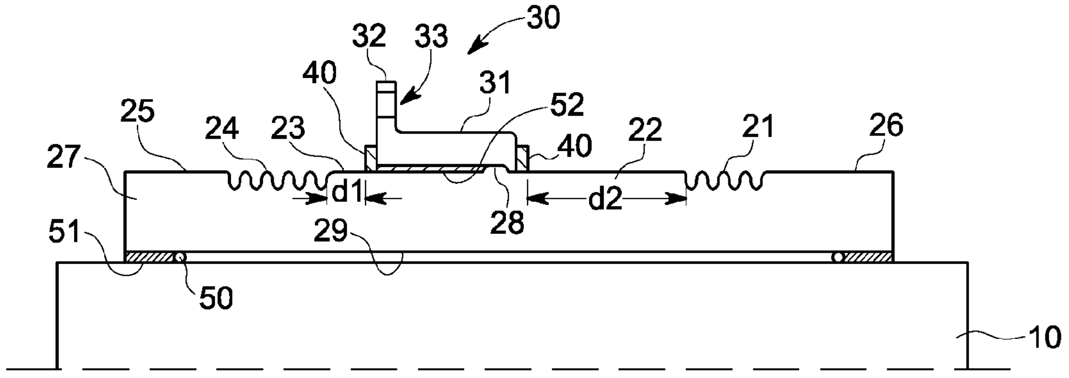
FIG. 2 illustrates a cross-section of a bushing according to an embodiment of the invention.

FIG. 2 illustrates a cross-section of a half of the bushing 1. The insulating sleeve 20 of the bushing 1 includes a substrate or main portion 27 made of an insulating material, such as porcelain. Annular rings 50 are located within the substrate 27 to mount the conductor 10 within the insulating sleeve 20. According to various embodiments, the annular rings 50 may either be part of the substrate 27 or may be independent structures that are inserted into a cavity in the substrate 27. In one embodiment, the annular rings are made of a conductive material, such as metal, and more specifically, a stainless steel spring ring. A spacer 51 is also provided at the ends of the insulating sleeve 20.

The flange 30 is mounted to the substrate 27 by a highly thermally-insulating (e.g., having a high thermal rating) epoxy-glass bonding material 52. In one embodiment, the substrate 27 includes a protrusion 28 that abuts a ridge of the flange 30 to hold a position of the flange 30 with respect to the substrate 27. The thermally-insulating epoxy 52 fills a space between the substrate 27 and the base portion 31 of the flange 30 corresponding to the height of the protrusion 28. The flange 30 further includes at least six holes 33 to mount the bushing 1 to a surface.

The semiconductor glazed portions 22 and 23 have lengths of d2 and d1, respectively. In one embodiment, the combined length d1+d2 is less than or equal to 12 inches long. For example, in one embodiment the first semiconductor glaze portion 22 is 5.5 inches long, and the second semiconductor glaze portion is 3.5 inches long.

According to one embodiment, an inner surface or wall 29 of the substrate 27 is glazed with a semiconductive glaze. The semiconductive glaze of the inner surface 29 has a surface resistivity that is less than the surface resistivity of the semiconductive glaze bands 22 and 23. For example, if the surface resistivity of the semiconductive glaze bands 22 and 23 is in a range between $10^{8}$-$10^{9}$ ohms/sq, then a surface resistivity of the semiconductive glaze of the inner surface 29 may be in a range between $10^{5}$-$10^{7}$ ohms/sq. The non-conducting glaze, or each glazed portion of the insulating sleeve 20 that does not include the semiconductive glaze, including the portions 25 and 26, and the ribbed portions 21 and 24, may have a surface resistivity in a range between $10^{12}$-$10^{14}$ ohms/sq.

Figure 3:
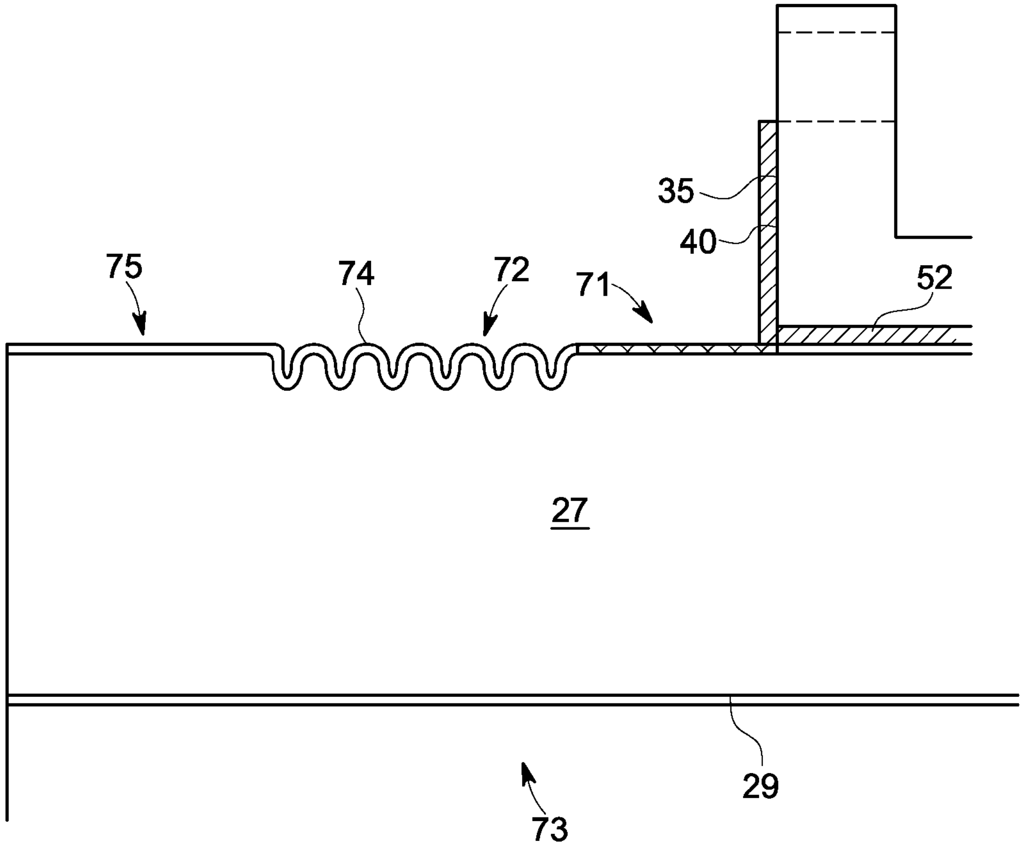
FIG. 3 illustrates a cross-section of a portion of the bushing according to an embodiment of the invention.

FIG. 3 illustrates a magnified portion of a portion of the bushing 1. The substrate 27 of the insulating sleeve 20 has glazed portions 71, 72, 73 and 75. The glazed portion 71, which corresponds to the second semiconductive-glazed band 23, includes a semiconductive-glazed band. The glazed portion 72, which corresponds to the second set of ridges 24, includes ridges 74. The glazed portion 75, which corresponds to the non-semiconductive-glazed portion 26, does not include ridges. The glazed portions 72 and 75 include a non-conductive, and a non-semiconductive, glaze. The glazed portion 73 includes a semiconductive glaze having a resistivity less than the resistivity of the glazed portion 71. In one embodiment, a thickness of the semiconductive-glazed bands 72 and 73 is 1/20 to 1/40 the thickness of the substrate 27.

An electrically conductive adhesive 40 whose surface resistivity can be as low as $1\text{-}10\times10^{-3}$ ohms/sq, is coated on an end surface 35 of the flange 30. The electrically conductive adhesive 40 electrically connects the flange to the semiconductive glaze of the glazed portion 71. The adhesive can be silicone or epoxy-based matrix filled with carbon black, or for endurance, with silver particles to achieve the performance required.

Table 1 illustrates a comparison of electric field distribution on an outer surface of a bushing 1 having the second semiconductive-glazed band 23 and a bushing having no semiconductive-glazed band.

The values of Table 1 correspond to a bushing attached to a structure filled with hydrogen ($H_2$), such as a turbo generator, so that the part of the bushing on one side of the flange is exposed to ambient air and the part of the bushing on the other side of the flange is exposed to the pressurized hydrogen. The values of Table 1 correspond to the side exposed to the hydrogen.

TABLE 1

| | Electric field on outer porcelain surface (H2 side) kV/in | |
|---|---|---|
| Testing voltage | 14.6 kV | 68 kV |
| No semiconductive-glaze ($10^{12}$-$10^{14}$ ohms/sq) | 51 | 239 |
| Example 1: 1 semiconductive-glazed band ($10^{7}$ ohms/sq) | 33.7 | 157 |
| Example 2 1 semiconductive-glazed band ($10^{9}$ ohms/sq) | 19.7 | 91 |

In the examples illustrated in Table 1, a voltage provided to the conductor 10 of 14.6 kV corresponds to a testing voltage which is 1.05× the maximal rated voltage of 24 kV/1.732 per IEC 60137 requirement, and the voltage of 68 kV corresponds to a high potential (Hipot) testing voltage that simulates a potential spike that may occur during operation, which is about three times the rated voltage of the bushing. In each example corresponding to embodiments of the present invention in which the second semiconductive-glazed band 23 is present, the electric field generated on the outer surface of the bushing 1 is substantially less than when a non-semiconductive glaze is used, thereby reducing significantly flashover and coronal discharge whose inception (triggering) strength requires a field of 75 kV/inch.

Table 2 illustrates a comparison of electric field distribution on an outer surface of a bushing 1 having the first semicondutive-glazed band 22 and a bushing that does not have the first semiconductive-glazed band 22.

The values of Table 2 correspond to a bushing attached to a structure filled with hydrogen ($H_2$), such as a turbine, so that the part of the bushing on one side of the flange is exposed to air and the part of the bushing on the other side of the flange is exposed to the pressurized hydrogen. The values of Table 2 correspond to the side exposed to the air.

TABLE 2

| | Electric field on outer porcelain surface (air side) kV/in | |
|---|---|---|
| Testing voltage | 14.6 kV | 68 kV |
| No semiconductive-glaze ($10^{12}$-$10^{14}$ ohms/sq) | 85 | 368 |
| Example 1: 1 semiconductive-glazed band ($10^7$ ohms/sq) | 33 | 160 |
| Example 2 1 semiconductive-glazed band ($10^9$ ohms/sq) | 19.4 | 94 |

In the examples illustrated in Table 2, the voltage provided to the conductor 10 of 14.6 kV corresponds to a testing voltage which is 1.05× the maximal rated voltage of 24 kV/1.732 per IEC 60137 requirement, and the voltage of 68 kV corresponds to a HiPot testing voltage that simulates a potential spike that may occur during operation, which is about three times the rated voltage of the bushing voltage spike that may occur during operation. In each example corresponding to embodiments of the present invention in which the semiconductive-glazed band 22 is present, the electric field generated on the outer surface of the bushing 1 is substantially less than when a non-semiconductive glaze is used, thereby reducing substantially the tendency of flashover and coronal discharge on the ambient air side. Without the voltage grading generated with the semiconductive bands of the above-described embodiments, the non-semiconductive glazed bushing would have an electric field of 85 kV/inch that is higher the corona inception field strength and thus would trigger frequently corona discharge at rated voltage during the operation. It is known the corona discharge eats the epoxy-glass bonding material and porcelain creepage ridges, resulting potentially reduced life and reliability in service.

Figure 4:
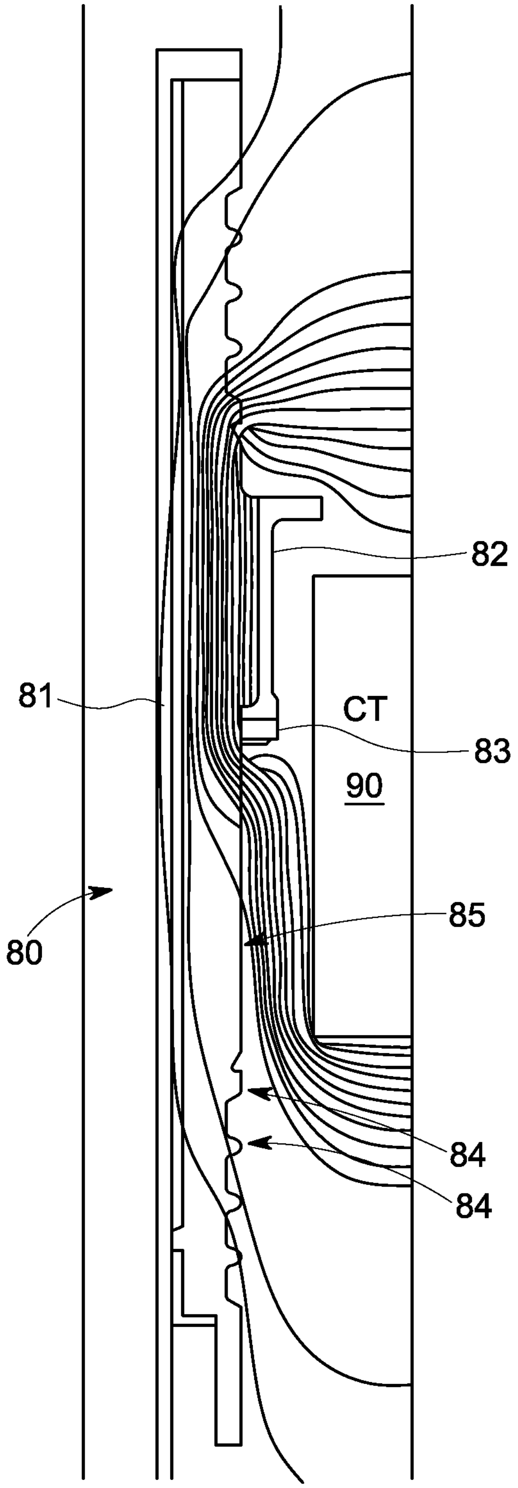
FIGS. 4 and 5 illustrate electric fields generated by current flowing in a conductor of a bushing with and without voltage grading.

FIG. 4 illustrates an electrical field, represented by dashed lines, that is generated when a current flows through a conductor 81 of the bushing 80. A current transformer 90 is positioned apart from the bushing 80. In one embodiment, the current transformer 90 monitors a current-flow, which can be as high as 25,000 amps, through the conductor 81 of the bushing 80. In the embodiment illustrated in FIG. 4, no semiconductive glaze is provided on the portion 85 of the outer surface of the bushing 80 between a flange 82 and ridges 84. Consequently, the electrical field generated when current flows through the conductor 81 extends upward to the current transformer 90 at an end 83 of a flange 82. This may result in the electrical field interfering with the operation of the current transformer 90, thereby reducing the accuracy of the current transformer 90.

Figure 5:
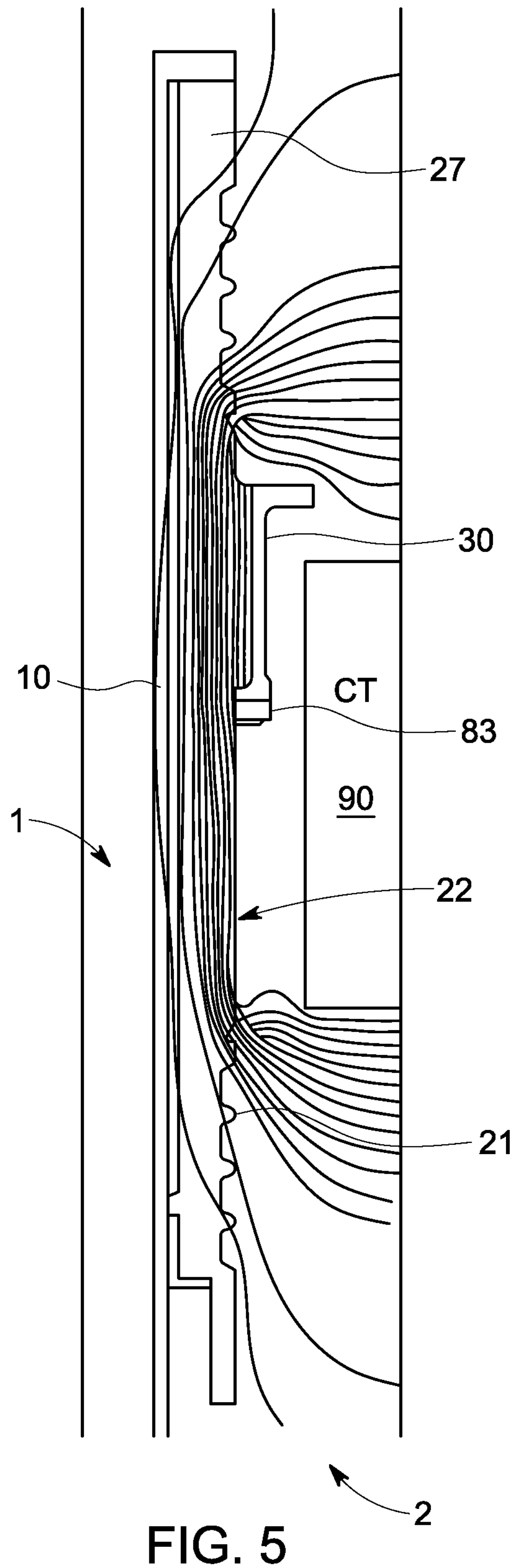

The utility of this bushing design can be further illustrated in FIG. 5, which illustrates another aspect of the bushing 1 according to the above-described embodiments of the present invention. The bushing 1 includes the semiconductive-glazed band 22 between the flange 30 and the ribs 21. When a current flows through the conductor 10, an electrical field, represented by dashed lines, does not extend away from the bushing 1 immediately adjacent to the flange 30. Instead, the electrical field extends within the substrate 27 along the semiconductive-glazed band 22 and extends away from the bushing 1 only at the end of the semiconductive-glazed band 22. Since an end of the semiconductive-glazed band is located past an end of the current transformer 90 with respect to an end 2 of the bushing 1, the electrical field does not interfere with the current transformer 90.

Figure 6:
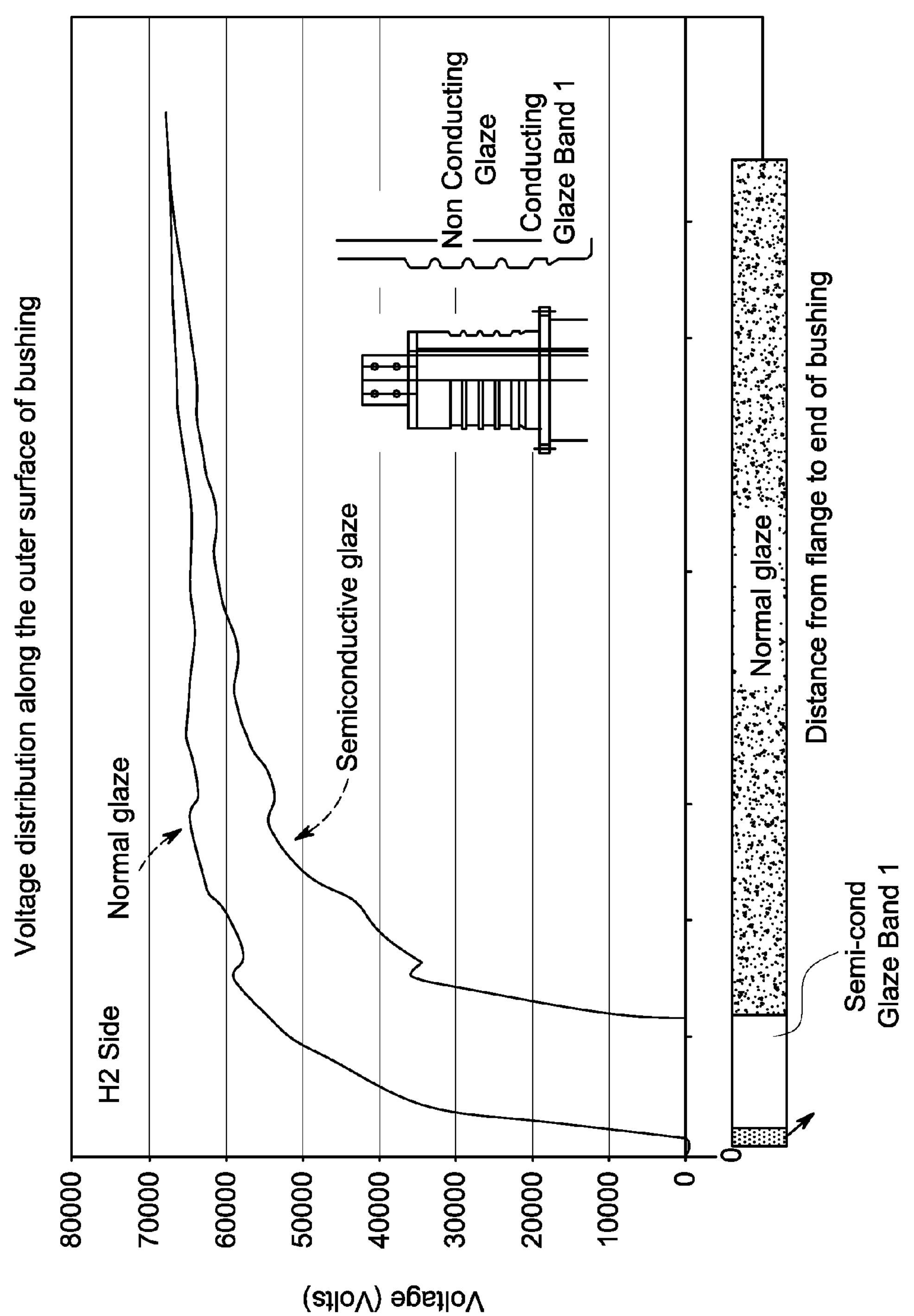
FIG. 6 is a graph illustrating a voltage distribution on a surface of a bushing.

FIG. 6 is a graph of a voltage distribution along an outer surface of a bushing 1 on the side of the flange 30 having the semi-conductive glazed portion 23, the second set of ridges 24, and the non-conductive glazed portion 26. As illustrated in FIG. 6, the voltage along the outer surface of the bushing 1 along the semiconductive-glazed band 23 is graded to zero volts, and only at the end of the semiconductive-glazed band 23 does the voltage along the outer surface of the bushing rise in a manner similar to the non-semiconductive-glazed bushing.

According to the above embodiments, a bushing has improved resistance to corona discharges and flashovers by glazing the bushing with a semiconductive glaze. The outer surface of the bushing includes bands of semiconductive glaze on either side of a flange. The inner surface of the bushing includes a semiconductor glaze having a resistivity different from that of the bands of the outer surface of the bushing. An electrically conductive adhesive is coated on ends of the flange to electrically connect the flange to the semiconductive-glazed bands.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A high voltage bushing assembly, comprising:

an insulating sleeve which is made of high strength alumina porcelain to surround a conductor;

a flange located on an outside surface of the insulating sleeve; and a first band of semiconductive glaze located on the outer surface of the insulating sleeve spaced apart from a first end of the insulating sleeve.

2. The bushing assembly of claim 1, wherein the first band is located between the flange and the first end of the insulating sleeve.

3. The bushing assembly of claim 1, further comprising a second band of semiconductive glaze on the outer surface of the insulating sleeve on an opposite side of the flange from the first band of semiconductive glaze.

4. The bushing assembly of claim 3, wherein a surface resistivity of at least one of the first and second bands of semiconductive glaze is between $10^8$-$10^9$ohms/sq.

5. The bushing assembly of claim 1, wherein the insulating sleeve includes inner walls to define an opening to receive the conductor, and the bushing assembly further comprises a third band of semiconductive glaze on the inner walls.

6. The bushing assembly of claim 5, wherein the third band of semiconductive glaze extends from the first end of the insulating sleeve to a second end of the insulating sleeve.

7. The bushing assembly of claim 5, wherein the third band of semiconductive glaze has a resistivity less than a resistivity of the first band of semiconductive glaze.

8. The bushing assembly of claim 7, wherein the first band of semiconductive glaze has a surface resistivity between $10^8$-$10^9$ohms/sq and the third band of semiconductive glaze has a surface resistivity between $10^5$-$10^7$ohms/sq.

9. The bushing assembly of claim 1, further comprising an electrically conductive adhesive having a surface resistivity in the range of 1-10 $\times 10^{-3}$ ohms/sq connecting the flange to the first band of semiconductive glaze.

10. The bushing assembly of claim 1, further comprising a non-semiconductive glazed portion between the first band of semiconductive glaze and the first end of the insulating sleeve.

11. The bushing assembly of claim 10, further comprising annular ridges located in the non-semiconductive glazed portion.

12. The bushing assembly of claim 1, further comprising a highly thermally-insulating epoxy glass bond material having a thermal rating of class 155 between the flange and the insulating sleeve.

13. A high voltage bushing system, comprising:

a bushing having an insulating sleeve surrounding a high current copper conductor and a non-magnetic stainless steel flange on an outside surface of the insulating sleeve to mount the bushing to a structure, the outside surface of the insulating sleeve having at least one band of semiconductive glaze spaced apart from an end of the insulating sleeve; and a current transformer spaced apart from the bushing to monitor a current of the conductor, the conductor being configured to carry up to approximately 25,000 amps.

14. The high voltage bushing system of claim 13, further comprising a band ofnon-semiconductive glaze located between the at least one band of semiconductive glaze and the end of the insulating sleeve.

15. The high voltage bushing system of claim 14, wherein a length of the at least one band of semiconductive glaze extends past an end of the current transformer with respect to the end of the bushing.

16. A high voltage bushing assembly, comprising:

an insulating sleeve to surround a conductor;

at least one band of semiconductive glaze on a surface of the insulating sleeve; and non-semiconductive glaze on portions of the surface of the insulating sleeve that do not include the at least one band of semiconductive glaze.

17. The high voltage bushing assembly of claim 16, wherein the at least one band of semiconductive glaze includes a first band of semiconductive glaze located on an outer surface of the insulating sleeve.

18. The high-voltage bushing assembly of claim 17, further comprising a flange surrounding an outer surface of the insulating sleeve, wherein the at least one band of semiconductive glaze further includes a second band of semiconductive glaze on an opposite side of the flange from the first band of semiconductive glaze.

19. The high voltage bushing assembly of claim 18, wherein the insulating sleeve includes an opening defined by inner walls extending between two opposing ends of the insulating sleeve to receive a conductor, and the at least one band of semiconductive glaze further includes a third band of semiconductive glaze on the inner walls of the opening.

20. The high voltage bushing assembly of claim 19, wherein the third band of semiconductive glaze has a resistivity different from the first band of semiconductive glaze.

* * * * *